Figure 1:
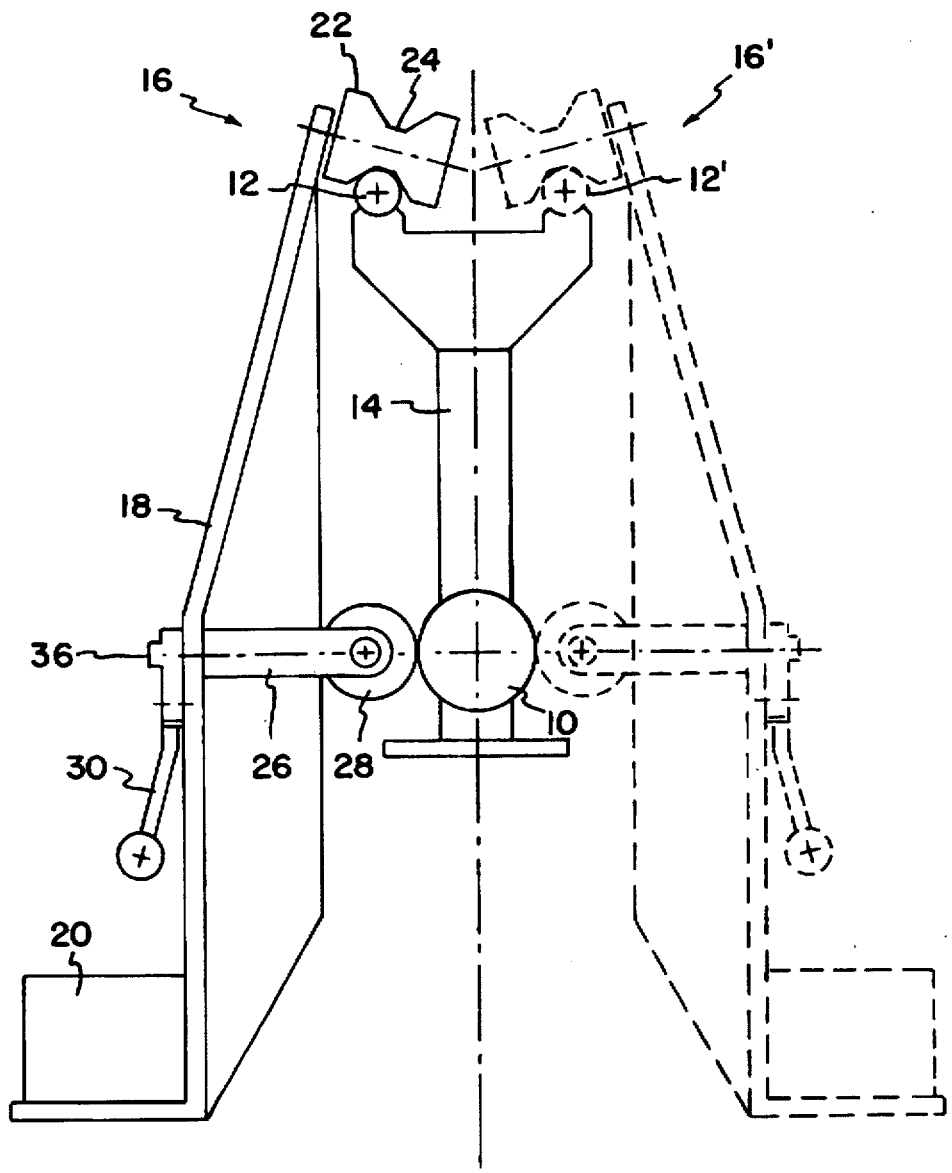

United States Patent [19]

Uhlenbusch

[11] Patent Number: 5,758,581
[45] Date of Patent: Jun. 2, 1998

[54] CONVEYOR SYSTEM WITH ROTARY SHAFT PROPULSION

[75] Inventor: Karlheinz Uhlenbusch, Oldenburg, Germany

[73] Assignee: Henke Maschinenbau GmbH, Lubecke-Alswede, Germany

[21] Appl. No.: 730,707

[22] Filed: Oct. 15, 1996

(Under 37 CFR 1.47)

[30] Foreign Application Priority Data

Oct. 27, 1995 [DE] Germany .................. 195 40 177.8

[51] Int. Cl.$^6$ ........................................ B61B 13/00
[52] U.S. Cl. ............................................. 104/166
[58] Field of Search ........................ 104/166, 89, 95;
105/148, 154

[56] References Cited

U.S. PATENT DOCUMENTS

| | | | |
|---|---|---|---|
| 4,065,007 | 12/1977 | Kurahashi | 104/166 |
| 4,620,280 | 10/1986 | Conklin | 104/166 |
| 4,964,343 | 10/1990 | Haruna et al. | 104/166 |
| 5,076,172 | 12/1991 | Grimm et al. | 104/166 |

FOREIGN PATENT DOCUMENTS

| | | | |
|---|---|---|---|
| 335 906 B | 11/1993 | European Pat. Off. | |
| 31 16 328 | 11/1982 | Germany. | |
| 32 46 129 | 6/1983 | Germany. | |
| 4266314 | 2/1992 | Japan | 104/166 |

*Primary Examiner*—S. Joseph Morano
*Attorney, Agent, or Firm*—Merchant Gould Smith Edell Welter & Schmidt

[57] ABSTRACT

The invention consists of a conveyor system with a drive shaft that can be rotated around its longitudinal axis, and at least one conveyor car with at least one frictional wheel, which for propulsion does roll off on the drive shaft with an/the axis of rotation inclined against the longitudinal axis of the drive shaft, where the conveyor system additionally contains first guiding devices with a first distance from the drive shaft that remains constant in longitudinal direction of the drive shaft, on which the conveyor car or cars are guided.

13 Claims, 6 Drawing Sheets

CONVEYOR SYSTEM WITH ROTARY SHAFT PROPULSION

The invention pertains to a conveyor system with a drive shaft that can rotate around its longitudinal axis, and at least one conveyor car with at least one frictional wheel, that for its propulsion does roll off on the drive shaft with the axis of rotation inclined against the longitudinal axis of the drive shaft.

A conveyor system of the described type is, e.g., amply known from EP-B 0 335 906. Its rotating drive shaft determines therein the track along which the conveyor cars can move. The propulsion of the conveyor cars occurs with a frictional wheel that is fixed to the conveyor car and, with frictional engagement, rolls off on the drive shaft.

Due to the axis of rotation of this frictional wheel being somewhat inclined against the longitudinal axis of the drive shaft, with a turning drive shaft, the frictional wheel rolls off on a spiral track on the surface of the rotating drive shaft. The inclination of the axis of rotation of the drive shaft determines here the slope of the spiral track, from which in turn, together with the RPM of the drive shaft—considering a certain slippage—results the speed of the travel of the conveyor car along the drive shaft. The conveyor cars are commonly suspended from a supporting arm, on the upper end of which two frictional wheels are located, which in the upper section of the lateral halves of the drive shaft sit left and right on it so that they are pushed onto the drive shaft by the force of gravity of the conveyor car and simultaneously carry the conveyor car. Such conveyor systems are often arranged in a closed loop track so that the conveyor cars can continuously run around in one direction. The simultaneous operation of conveyor cars in opposite directions is in this known arrangement in principle not possible, except with the aid of a second drive shaft.

Therefore, the invention has the goal to offer a conveyor system that allows the feasibility of a (simultaneous) operation of conveyor cars in opposite directions, without the requirement of an additional drive shaft.

According to the invention, the stated goal is achieved through a conveyor system of the type mentioned at the beginning that additionally contains first guiding devices with a first distance from the drive shaft that remains constant in longitudinal direction of the drive shaft, on which the conveyor car/cars is/are guided.

The inventive separation of propulsion means and transport devices enables the designer to provide readily, in addition to first transport devices, second and further transport devices, with the aid of which conveyor cars can be operated independently from the conveyor cars on the first transport devices, without a further drive shaft being required for this.

A variation of the conveyor system according to the invention is characterized in that the conveyor system contains for the guiding of conveyor cars, independently of the first guiding devices, additionally second guiding devices at a second distance from the drive shaft, with this distance remaining constant in longitudinal direction of the drive shaft.

The great advantage of the invention becomes particularly apparent for the second mentioned variation of the invention: The conveyor cars guided by the second guiding devices can be operated totally independent from the conveyor cars guided by the first transport devices. The conveyor cars guided by the first guiding devices must in the end all be transported at the same speed, to prevent collisions. The same applies to the conveyor cars depending on the second guiding devices, as well as to all conveyor systems known from the state of the art. Through the inventive introduction of first and second guiding devices it is, however, possible to operate the conveyor cars at two different speeds or in opposite directions. Even if only first guiding devices are provided—as described in the primary claim—it contains already the option for this, because through additional installation of second guiding devices—but not a second drive shaft—such an opposed direction operation or two-speed operation of conveyor cars can be realized.

It is especially advantageous if the distances of the first and second guiding devices from the drive shaft are always identical. This allows the use of the same conveyor cars both together with the first and also together with the second guiding devices so that only one type of conveyor car is required.

In a simple, and hence advantageous form of execution of the conveyor system, each of the guiding devices contains one guide rail and are preferably arranged above the drive shaft.

In an advantageous form of execution of a conveyor system, the guide rails of the first and second guiding devices are arranged next to each other above the drive shaft and at the same distance to it, and also have along their longitudinal direction a constant distance from each other.

The conveyor cars of the conveyor system according to the invention have preferentially guide rollers that have to be brought in contact with the guide rails.

Although in EP-B 0 335 906 a conveyor car (FIG. 2) is depicted with a pulley/roller (reference number 13) that on first look appears to be similar to the inventive guide roller, the pulley/roller serves—as is indicated in the description in EP-B '906 (column 3, lines 9–16) for hanging the conveyor car off the conveyor system and park it on a fixed "siding".

In order to make the adjustment of the travel speed of the conveyor cars by adjusting the inclination of the axes of rotation of its frictional wheel or its frictional wheels in relation to the longitudinal axis of the drive shaft possible, the conveyor cars of a preferred form of execution contain means for the adjustment of the inclination of the axes of rotation.

The just mentioned means for the adjusting each have a pivoting bearing for the frictional wheel with a pivot axis that is arranged essentially radial to the longitudinal axis of the drive shaft. It is especially advantageous to provide a pivoting bearing that locks/snaps into position for various axis of rotation inclinations.

The conveyor cars of a preferred form of execution of the conveyor system contain a supporting arm and a supporting device on the supporting arm, where the supporting arm is on its upper end equipped with at least one guide roller, and at the elevation of the drive shaft with the means for adjustment of the axes of rotation inclination. In this conveyor system, the first and second transport devices are preferentially arranged such that all frictional wheels of a conveyor car roll off on a first side of the drive shaft, if the conveyor car is guided by the first guiding devices, and that all frictional wheels of a conveyor car roll off on a second side of the drive shaft opposite of the first side, if the conveyor car is guided by the second guiding devices.

Preferentially, each conveyor car has two guide rollers that run with a certain spacing on the supporting rails, in order to assure that the frictional wheel runs during the conveying process always parallel to the drive shaft, and to prevent a rocking or swinging motion of the conveyor car.

In the last-mentioned variant of the invention is in a simple manner prevented that the conveyor cars, respectively guided by the first and second transport devices, do not interfere with each other so that the independent operation of the respective conveyor cars is assured. This is aided also by a variant of the conveyor system that is characterized by that each conveyor car during the conveyance is entirely situated on one side of a plane of symmetry, this variant practically assures that, after the expansion of the conveyor system, conveyor cars guided by the first and second guiding devices do not interfere with each other.

The guiding devices of a preferred conveyor system do form a closed loop. The drive shaft is here preferably a full-flighted drive shaft. The cars on each guiding device can in such a conveyor system be in continuous circulation.

In order to further increase the flexibility of the conveyor system, an advantageous form of execution of the conveyor system contains means for the reciprocal transfer of conveyor cars from the first to the second and/or in reverse.

Furthermore, an advantageous form of execution of the inventive conveyor system is distinguished by means for the removal and conveyance of conveyor cars from and to the transport devices, to readily allow fitting the number of the engaged conveyor cars to changing requirements.

Exceeding the claims according to the invention are further conveyor systems conceivable, in which in addition to the first and second transport devices further transport devices are provided, in order to allow in this way still more conveyor cars to be operated independently of each other. However, in practice will the expansion or the capability for expansion of the conveyor system by a second travel speed or travel direction be most important.

Figure 2:
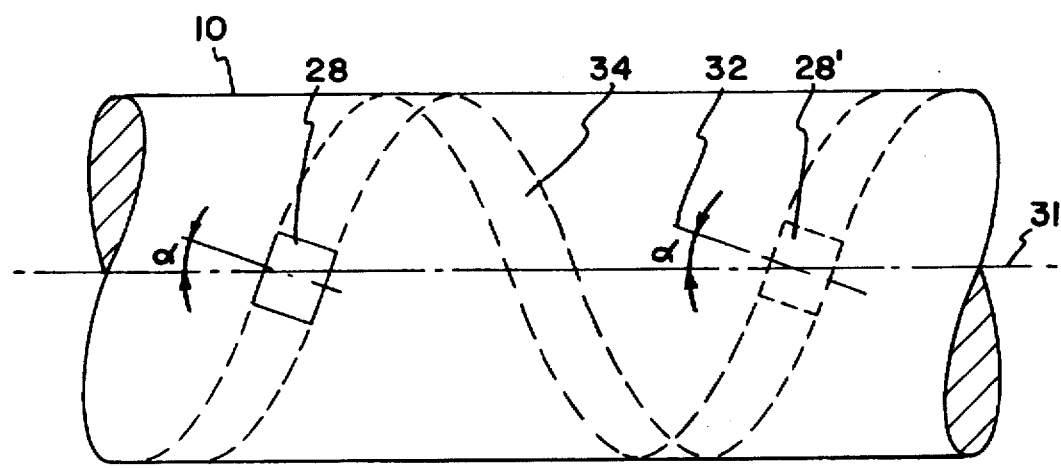
Figure 3:
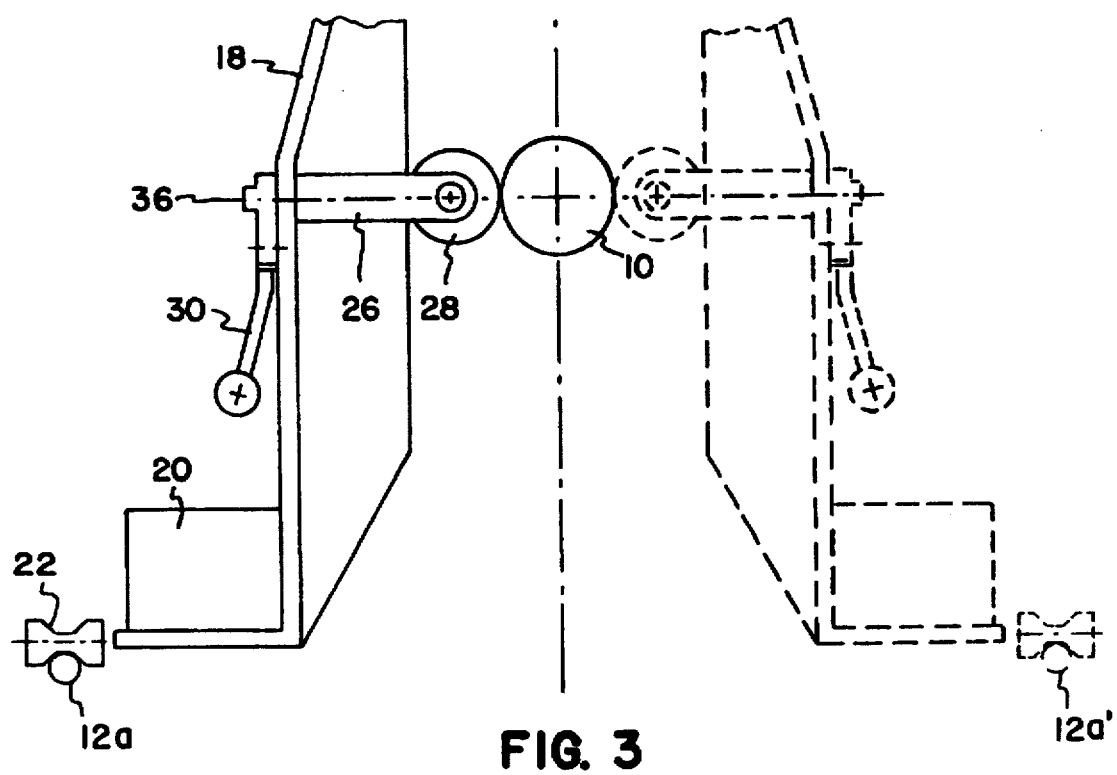
Figure 4:
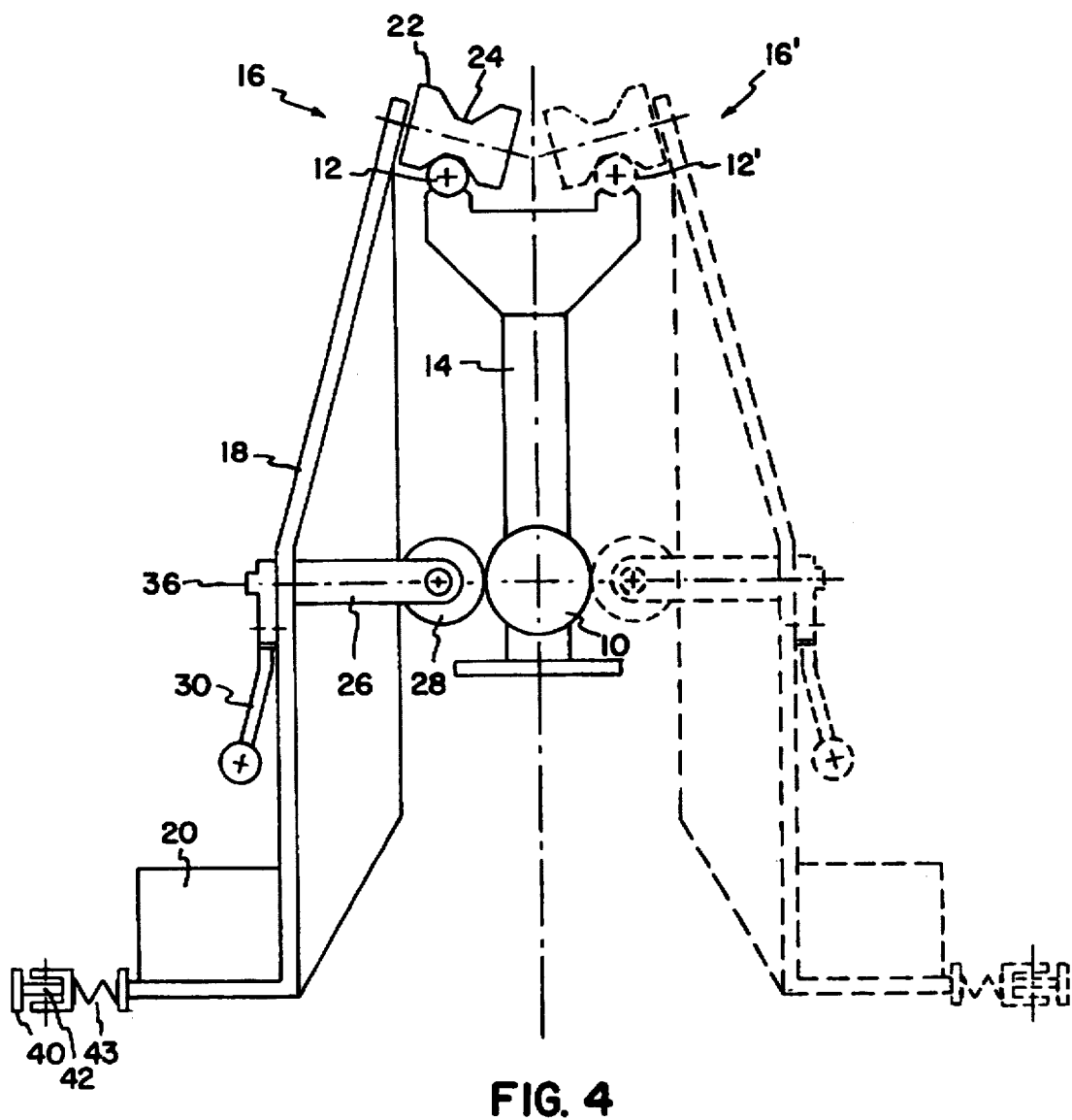
Figure 5:
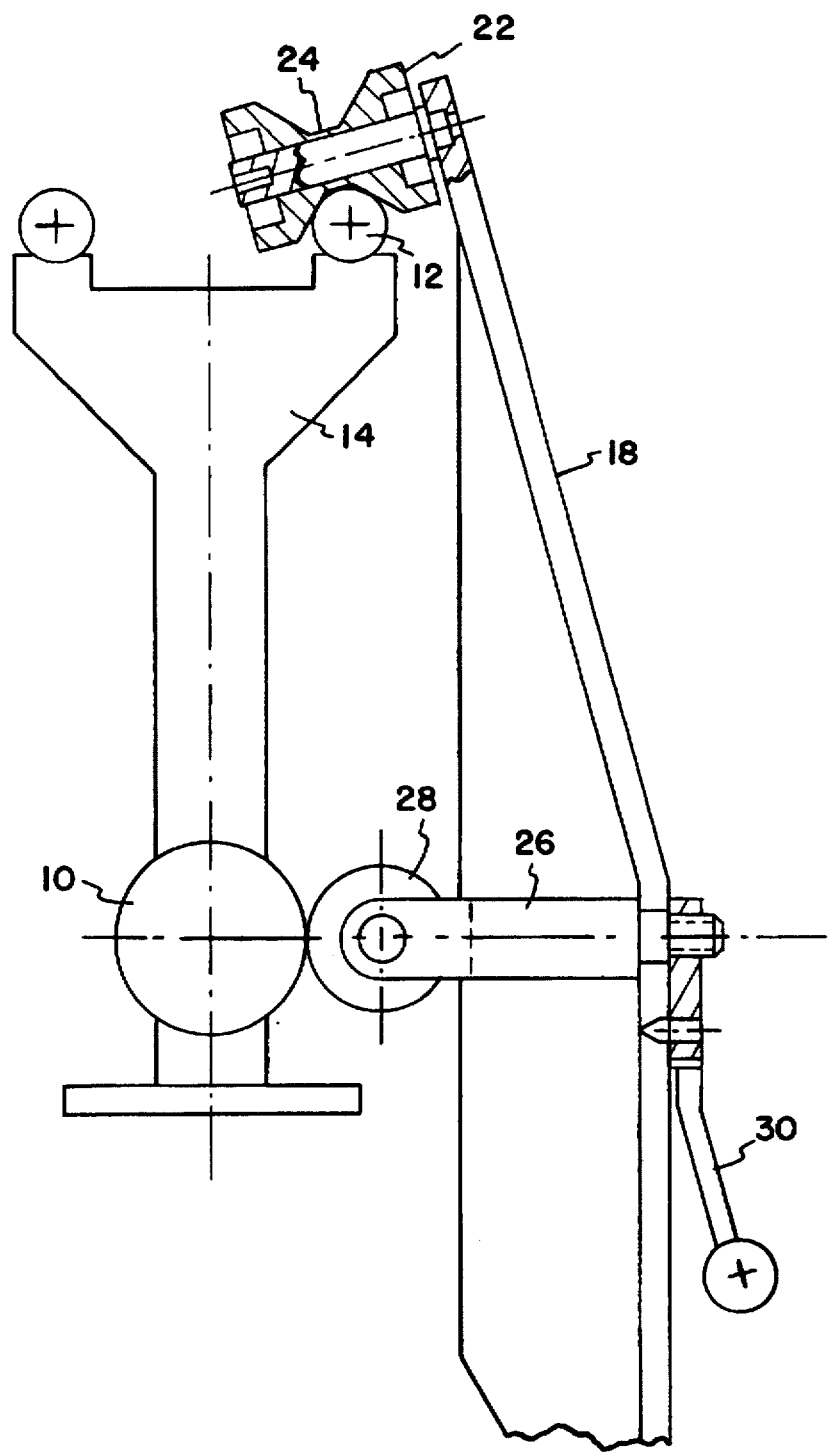
Figure 6:
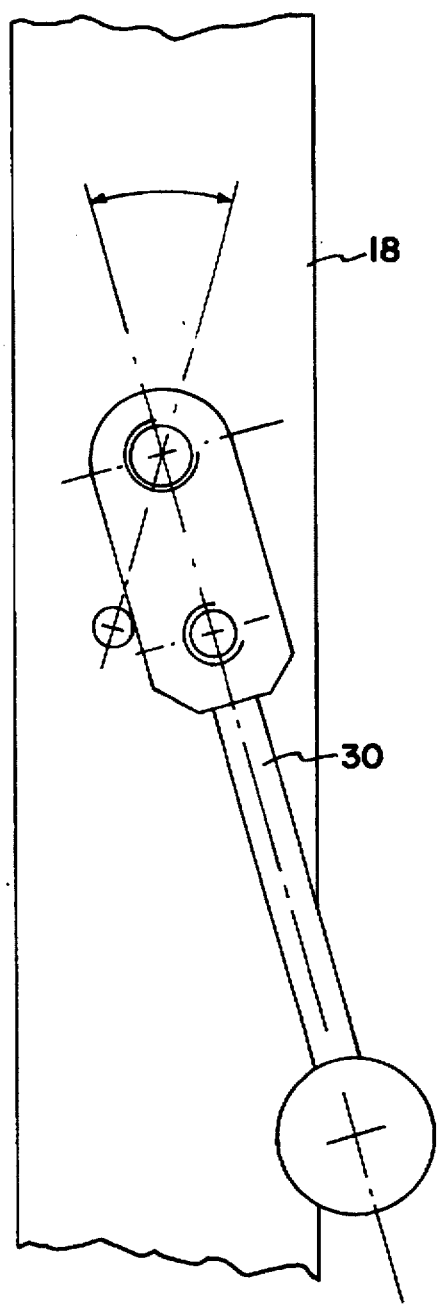

In the following, the invention is explained in detail on hand of the illustrations. These show in:

FIG. 1 a schematic depiction of an inventive conveyor system;

FIG. 2 a sketch of the drive shaft and a frictional wheel for the illumination of the propulsion principle;

FIG. 3 a variant of the conveyor system from FIG. 1, in which the guide rails are situated below and on the side of the drive shaft;

FIG. 4 the conveyor system of FIG. 1 with additional contact pressure devices;

FIG. 5 a detailed drawing of the conveyor system of FIG. 1 without conveying container; and FIG. 6 a detailed drawing of the pivoting lever on the supporting arm of the conveyor system of FIG. 1.

FIG. 1 depicts the essential components of the conveyor system according to the invention, i.e. a drive shaft 10, guiding devices consisting of a first rail 12 and supporting posts 14 and a conveyor car 16. The central element of the conveyor car 16 is a supporting arm 18, which carries a conveying container 20. Furthermore, a guide roller 22 is situated at the upper free end of the supporting arm 18. The guide roller 22 has a circumferential groove 24 with which it rolls on the rail 12. Additionally, a frictional wheel 28 is attached with a pivoting bearing on the supporting arm 18. A pivoting lever 30 is attached to the pivoting bearing 26.

The solid lines in FIG. 1 depict a conveyor system in which only first guiding devices in form of the rail 12 are realized. Such a conveyor system can easily be expanded by second guiding devices, which in this case are formed by the rail 12' depicted in this case through broken lines. This second rail 12' can conduct a second conveyor car 16', which can then be operated independently from the first conveyor car 16. The two conveyor cars 16 and 16' are here identical and, therefore, interchangeable. FIG. 1 clearly indicates the simple means by which the operation of a second conveyor system, that is independent of the first, can be installed.

The propulsion of the conveyor cars is here accomplished in the way known from the state of the art according to the principle depicted in FIG. 2. Depicted are the drive shaft 10 with its longitudinal axis 31 and a frictional wheel 28 with its axis of rotation 32. The axis of rotation 32 is here inclined against the longitudinal axis 31 by the angle $\alpha$. It follows from this that the frictional wheel 28 at an unchanged horizontal position rolls off on the indicated spiral track 34 on the rotating drive shaft and thereby propels itself along it. After a full rotation of the drive shaft 10, the frictional wheel 28 has moved into the position marked 28'. Since the drive shaft itself is stationary, the conveyor car 16 not shown in FIG. 2—but connected to the frictional wheel—has moved accordingly. The speed of the conveyor car 16 and its direction of travel depends here both on the RPM of the drive shaft and its diameter and also on the angle of inclination $\alpha$ that the axis of rotation 32 has against the longitudinal axis 31. This angle of inclination $\alpha$ determines together with the diameter of the drive shaft—with consideration given to a certain slippage between the frictional wheel 28 and the drive shaft 10—the slope of the spiral track 34. Consequently, by changing the inclination angle $\alpha$, the direction of travel and the speed of the conveyor car 16 can be varied.

The pivoting bearing 26, by which the frictional wheel 28 is attached to the supporting arm 18, serves the purpose of allowing the adjustment of the angle of inclination $\alpha$. The pivoting bearing 26 can be pivoted around the swiveling axis depicted in FIG. 1. The pivoting lever 30 serves here for the pivoting action.

The contact pressure (force) required here for the frictional engagement between the frictional wheel 28 and the drive shaft 10 is in the form of execution of the conveyor system depicted in FIG. 1 of the conveyor system generated by a component of the gravity force of the conveyor car 16.

In FIG. 1, the drive shaft 10 and also both rails 12 and 12' are only depicted in cross-section. Therefore, FIG. 1 does not show that the drive shaft 10 and the two rails 12 and 12' do have an equal distance to each other along their entire length. In the example of execution, the drive shaft 10 and also both rails 12 and 12' run essentially both in one horizontal plain and yield a horizontal hauling track. In such a form of execution, the components of the gravity force of the individual conveyor car to be overcome by the propulsion play the smallest role. However, within a framework that is essentially determined by the maximal frictional force between drive shaft and frictional wheel, rising or falling tracks can also be realized by correspondingly sloped guiding devices and drive shaft.

In the conveyor system in FIG. 3, the rails 12a and 12a' are arranged on the side and below the drive shaft 10. Correspondingly, the guide rollers 22 and 22' are attached to supporting arm 18 or 18' at a different position. This form of execution offers the same advantages as the one depicted in FIG. 1, with the only difference that—depending on the case of application—either the arrangement of the rails 12 and 12' or 12a and 12a' depicted in FIG. 1 or the one in FIG. 3 may be advantageous. In addition to the arrangement of the rails 12, 12', 12a and 12a' depicted in the form of examples in FIG. 1 and FIG. 3, also any number of further arrangements are conceivable.

In order to assure a safe frictional engagement between the drive shaft 10 and the frictional wheel 28 of a conveyor car 16, independently of the particular acting force of gravity, the conveyor car in FIG. 1 can be enhanced by means for increasing the contact pressure (force). These include in the example of execution in FIG. 4 a contact pressure rail 40 and a contact pressure roller 42, which are attached to the conveyor car 16 with a pressure element (pressure spring 44). These three elements have the function to increase the contact pressure (force) between the frictional wheel 28 and the drive shaft 10, if it should otherwise not be high enough for a sufficient frictional engagement between the frictional wheel 28 and the drive shaft 10. The chosen arrangement of contact pressure roller, pressure spring and contact pressure rail is here arbitrary; pressure spring and contact pressure roller can also be attached to other spots on the supporting arm 18, and correspondingly, the contact pressure rail 40 is arranged such that in operation it makes contact with the contact pressure roller 42.

FIG. 5 are essentially details of the support/bearing of the guide roller 22 on the supporting arm 18, and of the pivoting bearing 26 on the supporting arm 18. In particular, FIG. 5 reveals that the pivoting lever 30 attached to the pivoting bearing 26 has a hole for a plunger pin. FIG. 6 and FIG. 5 show, furthermore, that the hole in the pivoting lever 30 has to be aligned with one of three holes (of which two are covered in the drawing by the pivoting lever 30) in the supporting arm 18, so that the pivoting lever 30 can be arrested by insertion of a plunger pin in (one of) three predetermined positions, which are fixed in relation to the supporting arm 18. In two of the three positions, at a given RPM of the drive shaft 10 a fixed forward or backward speed of the conveyor car is determined by the angle of inclination α between the frictional wheels 28 of a conveyor car 16 and the drive shaft 10. In the median position of the pivoting lever 30, the axis of rotation 32 of the frictional wheel 28 and the longitudinal axis 31 of the drive shaft run, however, parallel to each other so that the corresponding conveyor car does not move, even with the drive shaft rotating.

As the forward or backward speed of a conveyor car depends at a given RPM of the drive shaft on the angle of inclination α between its frictional wheels 28 and the drive shaft 10, and an increase of the angle of inclination results in an increased speed of the conveyor car, several forward or backward speeds can be simply set by correspondingly providing several holes for the plunger pin in the supporting arm 18.

Through corresponding identical placement of the holes in the supporting arm 18 in all conveyor cars 16 is assured that the angle of inclination α between the frictional wheels of each conveyor car 16 and the drive shaft 10 are exactly the same, so that all conveyor cars have the same speed and, therefore, maintain during conveyance a predetermined distance to each other.

I claim:

1. A conveyor system, comprising:
   a drive shaft having a longitudinal axis, the drive shaft being rotatable around the longitudinal axis;
   at least one conveyor car, each having a frictional wheel, the frictional wheel rolling on the drive shaft, the frictional wheel having an axis of rotation inclined against the longitudinal axis of the drive shaft;
   at least one guiding assembly guiding the one conveyor car at a first distance from the drive shaft, the first distance remaining constant along the drive shaft, wherein the one frictional wheel is located on a first side of a vertical plane that runs through the longitudinal axis of the drive shaft; and
   a second guiding assembly guiding the conveyor car at a second distance from the drive shaft, the second distance remaining constant along the drive shaft, wherein a second frictional wheel of a second conveyor car guided by the second guiding assembly is located on a second side of the vertical plane.

2. A conveyor system according to claim 1, wherein the guiding assemblies are arranged above the drive shaft.

3. A conveyor system according to claim 2, wherein each of the guiding assemblies contains a guide rail.

4. A conveyor system according to claim 3, wherein the guide rails are arranged side by side above the drive shaft and at equal distance to the drive shaft.

5. A conveyor system according to claim 4, wherein each of the guide rails has, along its longitudinal direction, a constant first distance from the vertical plane that runs through the drive shaft.

6. A conveyor system according to claim 5, wherein each of the conveyor cars includes a guide roller which is engaged with each of the guide rails.

7. A conveyor system according to claim 6, wherein each of the conveyor cars has a pivoting member which adjusts an incline of the axis of rotation of each of the frictional wheels or of each of the frictional wheels relative to the longitudinal axis of the drive shaft.

8. A conveyor system according to claim 7, wherein the pivoting member includes a pivoting bearing for the frictional wheel, the pivoting bearing has a pivoting axis that is arranged substantially radial to the longitudinal axis of the drive shaft.

9. A conveyor system according to claim 8, wherein the pivoting bearing locks in position for various inclinations of the axis of rotation.

10. A conveyor system according to claim 9, wherein each of the conveyor cars includes at least one supporting arm and a carrying device on the supporting arm, an upper end portion of the supporting arm is connected to one of the guide rollers, and the pivoting member is disposed at an elevation of the drive shaft.

11. A conveyor system according to claim 10, wherein each of the conveyor cars includes a second guide roller such that in a direction of motion of each of the conveyor cars, the two guide rollers of each of the conveyor cars have a distance from each other.

12. A conveyor system according to claim 11, wherein the conveyor cars are situated on opposite sides of the vertical plane running through the longitudinal axis of the drive shaft, and the conveyor cars are guided by the corresponding guiding assembly assigned to its side.

13. A conveyor system according to claim 12, wherein the guiding assemblies form a closed loop and the drive shaft is a continuous drive shaft.

\* \* \* \* \*